United States Patent
Wehr et al.

(10) Patent No.: US 11,954,914 B2
(45) Date of Patent: Apr. 9, 2024

(54) BELIEF PROPAGATION FOR RANGE IMAGE MAPPING IN AUTONOMOUS MACHINE APPLICATIONS

(71) Applicant: NVIDIA Corporation, Santa Clara, CA (US)

(72) Inventors: David Wehr, Redmond, WA (US); Ibrahim Eden, Redmond, WA (US); Joachim Pehserl, Lynnwood, WA (US)

(73) Assignee: NVIDIA Corporation, Santa Clara, CA (US)

( * ) Notice: Subject to any disclaimer, the term of this patent is extended or adjusted under 35 U.S.C. 154(b) by 435 days.

(21) Appl. No.: 17/392,050

(22) Filed: Aug. 2, 2021

(65) Prior Publication Data
US 2023/0033470 A1 Feb. 2, 2023

(51) Int. Cl.
*G06V 20/58* (2022.01)
*G01B 11/22* (2006.01)
*G01S 17/89* (2020.01)
*G05D 1/00* (2006.01)
*G05D 1/02* (2020.01)
(Continued)

(52) U.S. Cl.
CPC ............ *G06V 20/58* (2022.01); *G01B 11/22* (2013.01); *G01S 17/89* (2013.01); *G05D 1/0231* (2013.01); *G06N 7/01* (2023.01); *G06T 7/579* (2017.01); *G06T 7/70* (2017.01);
(Continued)

(58) Field of Classification Search
None
See application file for complete search history.

(56) References Cited

U.S. PATENT DOCUMENTS 10,885,698 B2 * 1/2021 Muthler ................. G06N 3/084
11,275,673 B1 * 3/2022 Dolan ................. G06F 11/3664
(Continued)

FOREIGN PATENT DOCUMENTS

WO  WO-2021010036 A1 * 1/2021 ........... H04N 5/3745

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Delomia L Gilliard
(74) *Attorney, Agent, or Firm* — Taylor English Duma L.L.P.

(57) ABSTRACT

In various examples, systems and methods are described that generate scene flow in 3D space through simplifying the 3D LiDAR data to "2.5D" optical flow space (e.g., x, y, and depth flow). For example, LiDAR range images may be used to generate 2.5D representations of depth flow information between frames of LiDAR data, and two or more range images may be compared to generate depth flow information, and messages may be passed—e.g., using a belief propagation algorithm—to update pixel values in the 2.5D representation. The resulting images may then be used to generate 2.5D motion vectors, and the 2.5D motion vectors may be converted back to 3D space to generate a 3D scene flow representation of an environment around an autonomous machine.

20 Claims, 15 Drawing Sheets

(51) Int. Cl.
*G06N 7/01* (2023.01)
*G06T 7/579* (2017.01)
*G06T 7/70* (2017.01)

(52) U.S. Cl.
CPC .............. *G06T 2207/10028* (2013.01); *G06T 2207/20081* (2013.01); *G06T 2207/30261* (2013.01)

(56) References Cited

U.S. PATENT DOCUMENTS

| | | | |
|---|---|---|---|
| 2016/0267325 A1* | 9/2016 | Sundaresan | G06T 7/215 |
| 2017/0212518 A1* | 7/2017 | Iimura | G05D 1/0214 |
| 2018/0364717 A1* | 12/2018 | Douillard | G06T 7/187 |
| 2019/0057509 A1* | 2/2019 | Lv | G06T 7/70 |
| 2020/0256999 A1* | 8/2020 | Yellepeddi | G01S 17/89 |
| 2020/0296310 A1* | 9/2020 | Hicks | H04N 25/705 |
| 2021/0046861 A1* | 2/2021 | Li | G06V 10/30 |
| 2021/0327128 A1* | 10/2021 | Yu | G06T 19/20 |
| 2022/0279203 A1* | 9/2022 | Mangan | H04N 19/513 |
| 2022/0351392 A1* | 11/2022 | Maharana | G06T 7/269 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

* cited by examiner

BELIEF PROPAGATION FOR RANGE IMAGE MAPPING IN AUTONOMOUS MACHINE APPLICATIONS

BACKGROUND

In order to operate safely and effectively, autonomous and semi-autonomous vehicles need to identify moving obstacles or objects at varying distances so that appropriate action may be timely taken. For example, an appropriate action can include turning, changing lanes, braking, and/or accelerating to avoid or maneuver away from identified obstacles. In addition, determining the obstacles and their movement early and accurately allows time for the appropriate action to be determined and executed. As such, object detection and tracking must be done in real time, or near real time, even when the vehicle is traveling at highway speeds or when cross-traffic is present.

A representation of static and/or moving objects in three-dimensional (3D) space may be referred to as scene flow. Existing scene flow systems are typically designed to be stationary and/or to have limited fields of view. Due to the complexity and compute requirements of performing scene flow in 3D space, existing scene flow systems may also be incapable of operating in real time, or may be able to run in real time only at a limited resolution and/or accuracy. Thus, existing autonomous vehicles have relied upon other methods and data sources of obstacle detection due to these limitations, such as relying on camera-based neural networks, LiDAR point clouds, and/or RADAR data. However, camera-based neural networks, while accurate at short distances, are not as accurate at further distances due to the limited amounts of pixels representing any given object or obstacle. In addition, LiDAR sensors and RADAR sensors generally include missing data points and may be =noisy. These existing methods typically rely upon analyzing singular frames of data, which can lack important context that can only be gained by analyzing multiple frames across time.

SUMMARY

Embodiments of the present disclosure relate to belief propagation for range image mapping in autonomous machine applications. Systems and methods are disclosed that provide LiDAR-based scene flow in real time at least in part by focusing on motion over time instead of single-frame detection. In contrast to conventional systems, such as those described above, the current system and methods generate scene flow in 3D space through simplifying the 3D LiDAR data to an enhanced two-dimensional ("2.5D") depth flow space (e.g., x, y, and depth flow—indicating a change in depth values between LiDAR range images), passing messages between pixels (e.g., between nodes of a pixel representation, such as a matrix, grid, table, etc., corresponding to the pixels)—through, e.g., a belief propagation algorithm—and calculating 3D motion vectors for pixels by converting the 2.5D information back to 3D space (e.g., based on known associations between the 2.5D image space locations and 3D world space locations). As a result, noisy or missing information from the LiDAR data may be estimated using message passing—e.g., in 2D or 2.5D space—to generate a more dense representation of the scene, and the more dense representation may then be converted back to 3D space for use in detecting, identifying, and/or tracking dynamic objects in the environment. The current system may be configured to be used on a mobile platform, such as an autonomous machine (e.g., vehicle, robot, etc.), and may include, e.g., spinning LiDAR sensors, or other depth sensors, that provide a wider field of view (e.g., up to 360 degrees) than existing systems. In addition, due to a substantial portion of the computations taking place with respect to projection images (e.g., LiDAR range images), instead of in 3D space, the current system is also capable of operating in real time to identify moving obstacles.

BRIEF DESCRIPTION OF THE DRAWINGS

The present systems and methods for belief propagation for range image mapping in autonomous machine applications are described in detail below with reference to the attached drawing figures, wherein.

DETAILED DESCRIPTION

Figure 1A:
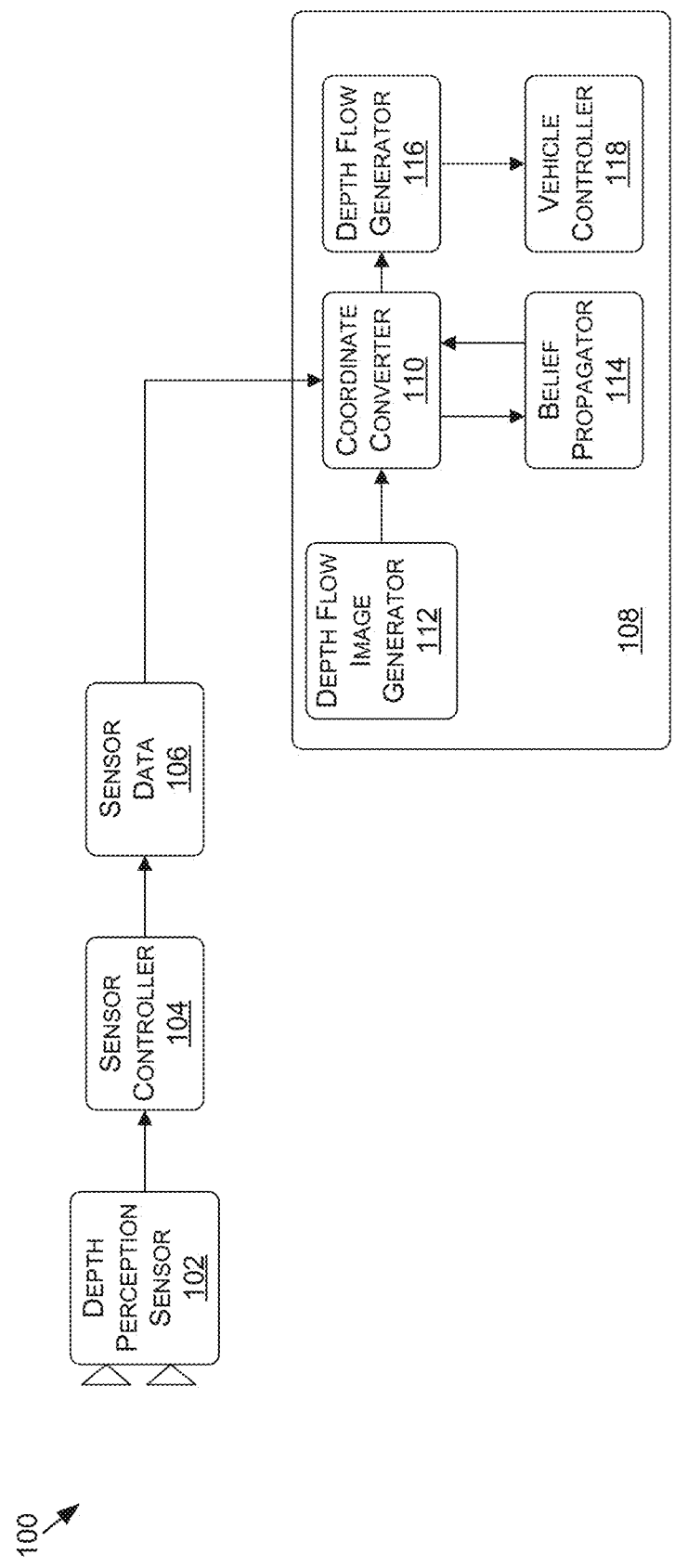
FIG. 1A is a data flow diagram illustrating a scene flow estimation system, in accordance with some embodiments of the present disclosure.

Systems and methods are disclosed related to belief propagation for range image mapping in autonomous machine applications. Although the present disclosure may be described with respect to an example autonomous vehicle 800 (alternatively referred to herein as "vehicle 800" or "ego-vehicle 800," an example of which is described with respect to FIGS. 8A-8D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle or autonomous machine types. In addition, although the present disclosure may be described with respect to generating scene flow for autonomous driving, this is not intended to be limiting, and the systems and methods described herein may be used in augmented reality, virtual reality, mixed reality, robotics, security and surveillance, autonomous or semi-autonomous machine applications, and/or any other technology spaces where scene flow may be used.

Embodiments of the present disclosure relate to scene flow determination using depth sensors, such as LiDAR sensors used on autonomous vehicles, through creation and analysis of range images generated from LiDAR range (or other projection) images. For example, the LiDAR sensors may generate 3D LiDAR data representative of their field of view or sensory field—e.g., the LiDAR data may represent a standard spherical projection or other projection type. The LiDAR sensors may continuously generate the LiDAR data such that numerous sets of LiDAR data are generated—each indicative of a single sweep or revolution of the LiDAR sensor. The sets of LiDAR data may be separated by a time interval—corresponding to the time interval required to complete one revolution, for example—and embodiments of the present disclosure may use a first (e.g., current) set of LiDAR data and compare it to a second, previous (e.g., immediately prior) set of LiDAR data to determine various information from the data, as discussed herein. In some embodiments, two consecutive sets of LiDAR data may be analyzed; however, this is not intended to be limiting and the analyzed sets of LiDAR data may correspond to different arrangements of data other than consecutive frames.

The complex 3D LiDAR data (e.g., representative of a 3D point cloud) may be simplified to a 2D LiDAR range image (or other projection image type), and may also be encoded with additional information (such as depth flow) to generate a 2.5D depth flow image (alternatively referred to herein as a "depth flow image") that allows for more rapid analysis. In some embodiments, the depth flow image may also be reduced in resolution using a pyramid or multi-scale approach to aid in identifying optical flow information more quickly, especially where larger movement is occurring between frames. The depth flow image may include a set of pixels, each with a set of two-dimensional (2D) coordinates and a depth flow value (indicative of changes in depth or range across frames). In some embodiments, the depth flow may be simplified as a set of labels (e.g., where a label-based algorithm is employed, such as belief propagation) indicative of motion toward the sensor, motion away from the sensor, and/or no motion toward or away (e.g., stationary). For example, these depth flow values may be represented as a $-1$ (toward), $+1$ (away), and $0$ (stationary), respectively. In some embodiments, the depth flow may be more granular, and may represent rapid motion toward the sensor, slow motion toward the sensor, no motion toward the sensor, slow motion away from the sensor, and/or rapid motion away from the sensor. This simplified depth flow information may allow for the analysis discussed herein.

When comparing two—e.g., consecutive—range images, one range image (e.g., the prior image) may be transformed or rectified to a coordinate system of the subsequent or current range image (or vice versa), so as to compensate for ego-motion. By compensating for ego-motion, subsequent analysis may only require accounting for movement of objects relative to the ego-vehicle because the motion of the ego-vehicle has been factored out—thereby allowing for alignment of the two range images in a same coordinate system.

In some embodiments, two or more range images are compared so as to determine the 3D motion vectors associated with each pixel therein. The 3D motion vector is generated through analysis of two or more depth images via a message-passing belief propagation algorithm. For example, pixel data can be propagated to neighboring pixels (e.g., pixel nodes represented in a matrix, table, grid, etc.) through the belief propagation algorithm, and the data received at the neighboring pixels (e.g., neighboring nodes of the pixel representation) are analyzed and used to determine updated values for the pixels. Additional iterations are then performed to refine the results.

In general, belief propagation is a message-passing algorithm for inferring information from graphical models. While belief propagation can be exact in some cases, it is often used for approximations. The belief propagation algorithm may require two constraints to be defined: first is to determine a data term; and second is to determine a smoothness term. The data term may be used to identify similar or the same pixels across the two range images so that the movement of the object represented by the pixels can be determined. The smoothness term may be used to adjust the values across adjacent pixels so that identified objects move together, or boundaries between objects or surfaces are treated as such. The messages may be sent between pixels (e.g., pixel nodes corresponding to the pixels) of the same depth flow image and carry information regarding both the data term and the smoothness term. Specifically, the messages may include the depth flow information (to help identify a general direction in and out for identifying the correct pixels between images), 2D pixel flow information (pixel movement between frames), and/or the cost (to help identify how much the pixels should influence their neighbors).

The data term may identify which pixels in the two or more range images correspond to the same object (or part of the same object). The data term may be useful, in embodiments, because the physical object and/or the depth sensors are moving between images. Variables such as the depth flow, reflectivity, color values, intensity, time of flight (ToF), texture, return behavior, and/or other information (such as those represented by LiDAR data, or represented in LiDAR range images) may be analyzed in the data term.

Messages may not be passed between pixels (e.g., pixel nodes) that correspond to disparate objects. For example, adjacent pixels that are calculated to not correspond to the same physical object in the physical environment (such as because a detected difference in depth or reflectivity between the two pixels exceeds a certain threshold) will not pass messages between one another. This is because these pixels should not influence their neighboring pixels because they correspond to different physical objects. Thus, disparities between these neighboring pixels may not be unduly influenced by the belief propagation algorithm.

The smoothness term may identify which value for depth flow is approximately correct for pixels that correspond with the same physical object. Typically, a physical object moving in space moves as a single unit. Thus, the incomplete and imprecise data of some pixels can be adjusted and influenced by neighboring pixels to account for this information. For example, a cost is assigned to each pixel based upon how reliable the data associated therewith is. For pixels with incomplete data (for example, no return to the LiDAR sensor), a low cost may be assigned such that they are more likely to be influenced by their neighboring pixels through the belief propagation algorithm. This may allow a dense motion field to be created despite missing data from the original LiDAR scan.

Through the passing and analysis of these messages between pixels of the same depth flow image, accuracy of the various data at each pixel may be improved to a refined 2D (or 2.5D) motion vector. Missing or incomplete data for other pixels can also be estimated and refined.

The 2D (or 2.5D) vectors may then be converted back to 3D space using known correspondence between 2D image space and 3D world space locations. As such, a 3D motion vector for points in the LiDAR point clouds may be determined, where the 3D motion vectors represent the difference (or movement) of the points—and thus the objects or obstacles—across frames of the LiDAR data. Thus, the message-passing belief propagation algorithm allows for this complex analysis to be simplified and completed before returning to the 3D space—thus reducing the compute requirements and run time of the system by avoiding analysis in a 3D coordinate system. Ultimately, the scene flow shows the motion of the various physical objects around the depth sensors, and may be used to detect and track dynamic objects around an autonomous or semi-autonomous machine, such that various appropriate actions may be taken by the machine to account for the objects.

With reference to FIG. 1A, FIG. 1A is an example scene flow generation system 100 in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system 100 may include similar components, features, and/or functionality to that of vehicle 800 described herein with respect to FIGS. 8A-8D, example computing device 900 of FIG. 9, and/or example data center 1000 of FIG. 10.

As shown in FIG. 1A, the scene flow system 100 may include one or more depth perception sensors 102 (such as a LiDAR sensor, a RADAR sensor, an ultrasonic sensor, etc.). The depth perception sensor(s) 102 may generally include a transmitter and a receiver, and may include any suitable field of view or sensory field—such as a wide field of view (e.g., 180 degrees up to 360 degrees)—and may move (e.g., rotate), in embodiments, so as to gain a view of a larger area relative to the depth perception sensor 102. The—e.g., LiDAR—signals may reflect off objects in the vicinity of the depth perception sensor 102. The objects may be moving relative to the depth perception sensor 102, and the depth perception sensor 102 may be moving relative to an underlying surface (such as a road upon which the autonomous vehicle is driving). The receiver may receive an indication (directly or indirectly) of these various reflected signals, and the indication may be stored and/or transmitted as data for later analysis.

The depth perception sensor 102 may have a sensor controller 104 that may be used to control the operation of the depth perception sensor 102 and interpret the results. For example, the sensor controller 104, or other processor, may receive the sensor data 106, and process, analyze, or otherwise perform calculations related to the sensor data 106. In some embodiments, the depth perception sensor 102 and/or sensor controller 104 may be similar to the LiDAR sensor 864 described with respect to FIGS. 8A-8C, or may be another type of depth perception sensor 102.

Figure 8A:
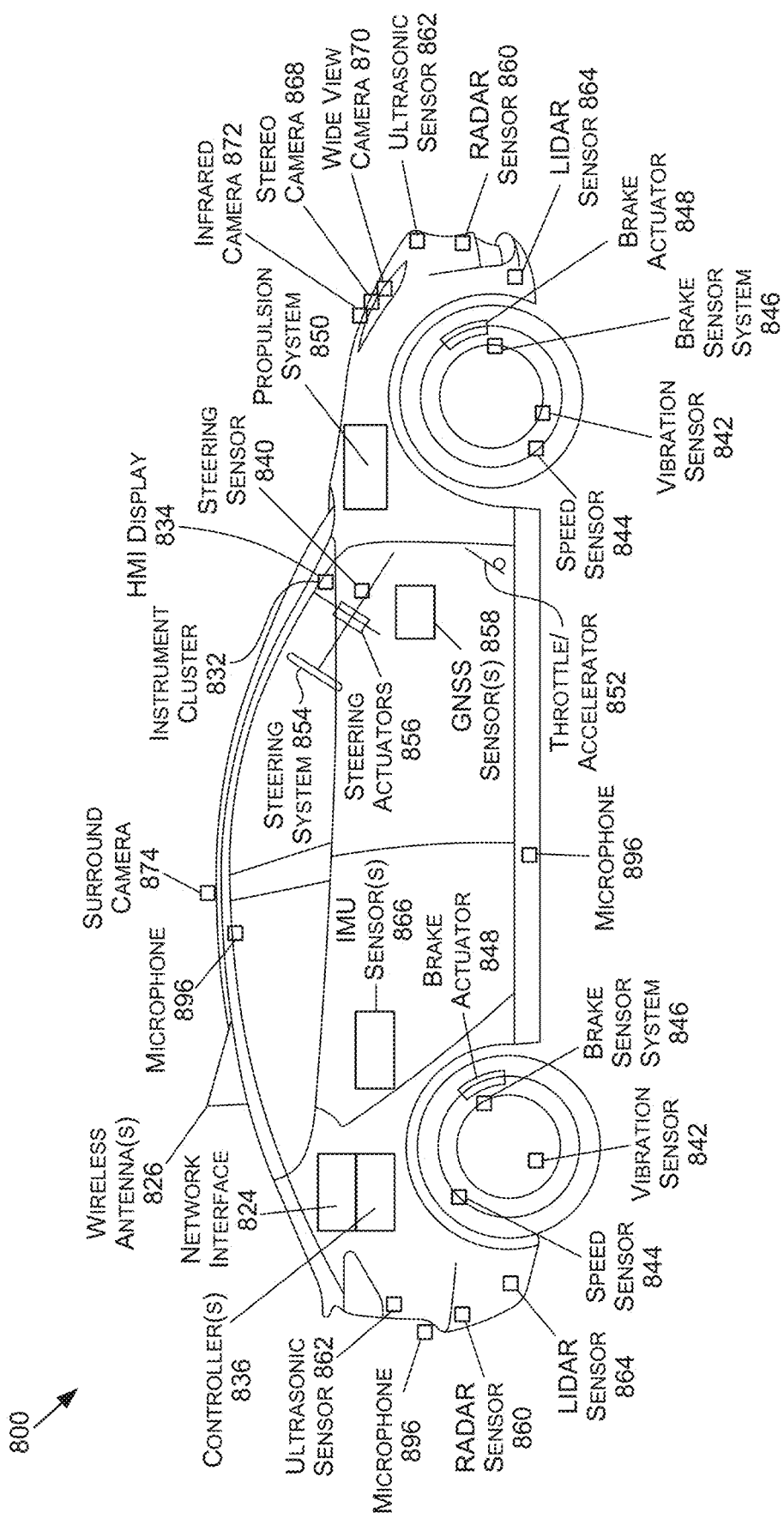
FIG. 8A is an illustration of an example autonomous vehicle, in accordance with some embodiments of the present disclosure.
Figure 8B:
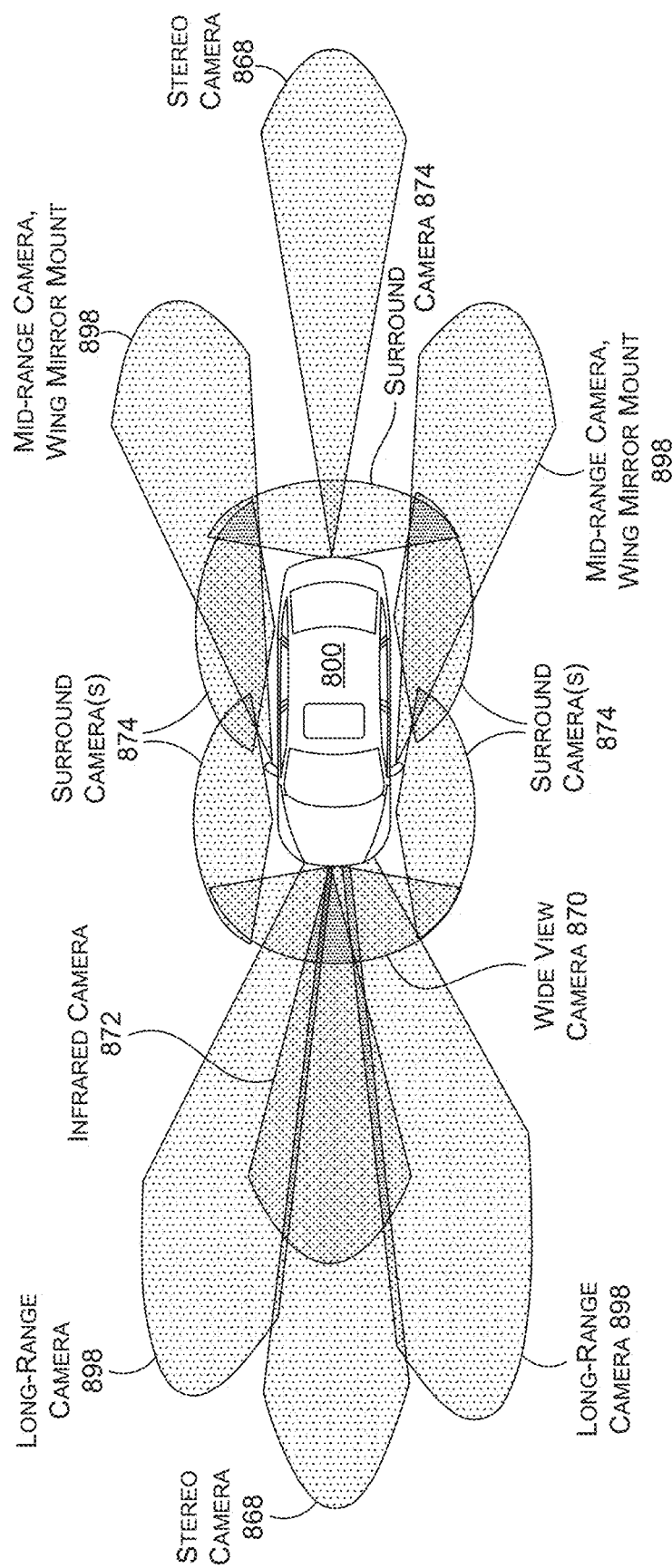
FIG. 8B is an example of camera locations and fields of view for the example autonomous vehicle of FIG. 8A, in accordance with some embodiments of the present disclosure.
Figure 8C:
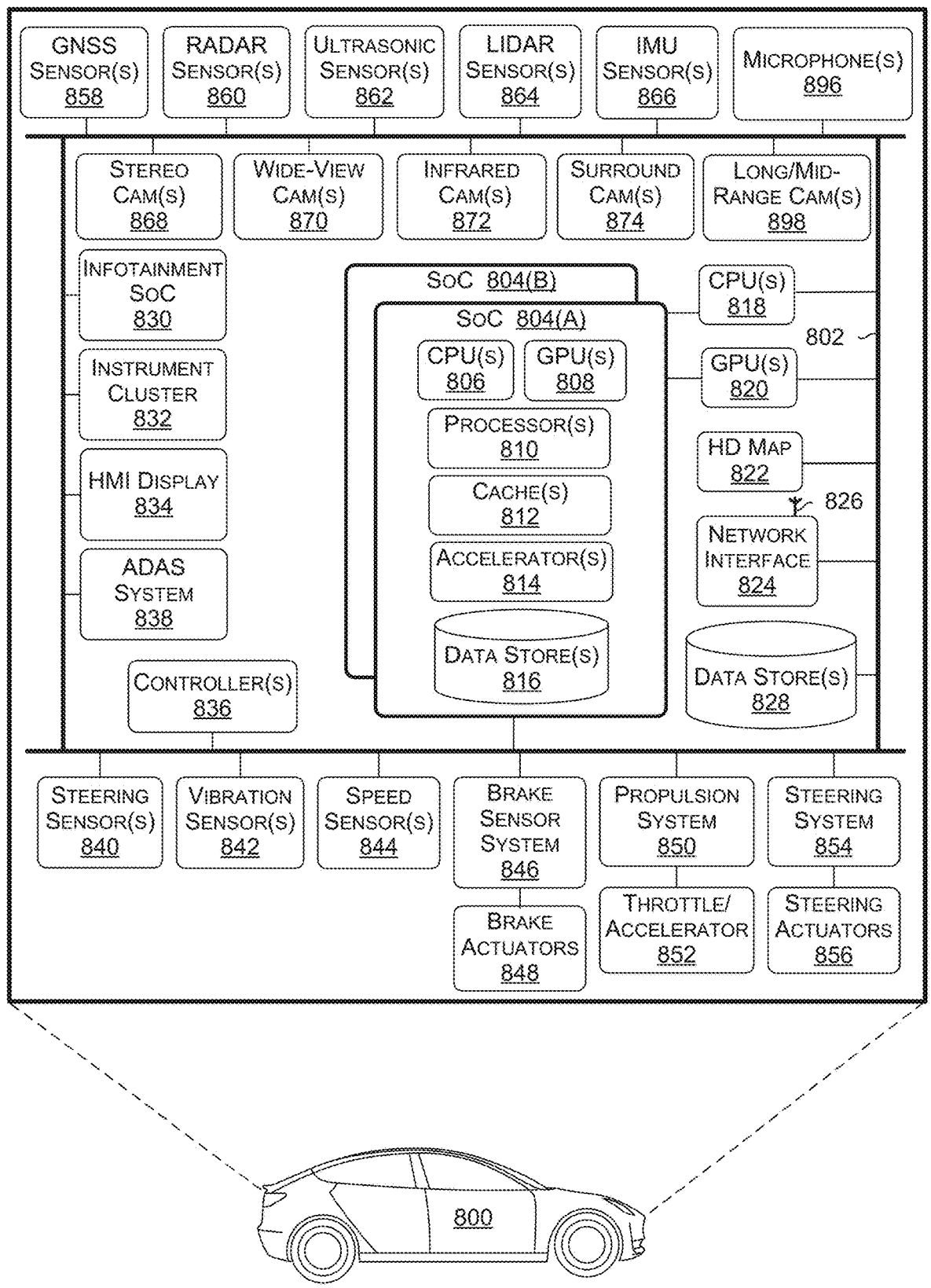
FIG. 8C is a block diagram of an example system architecture for the example autonomous vehicle of FIG. 8A, in accordance with some embodiments of the present disclosure.
Figure 9:
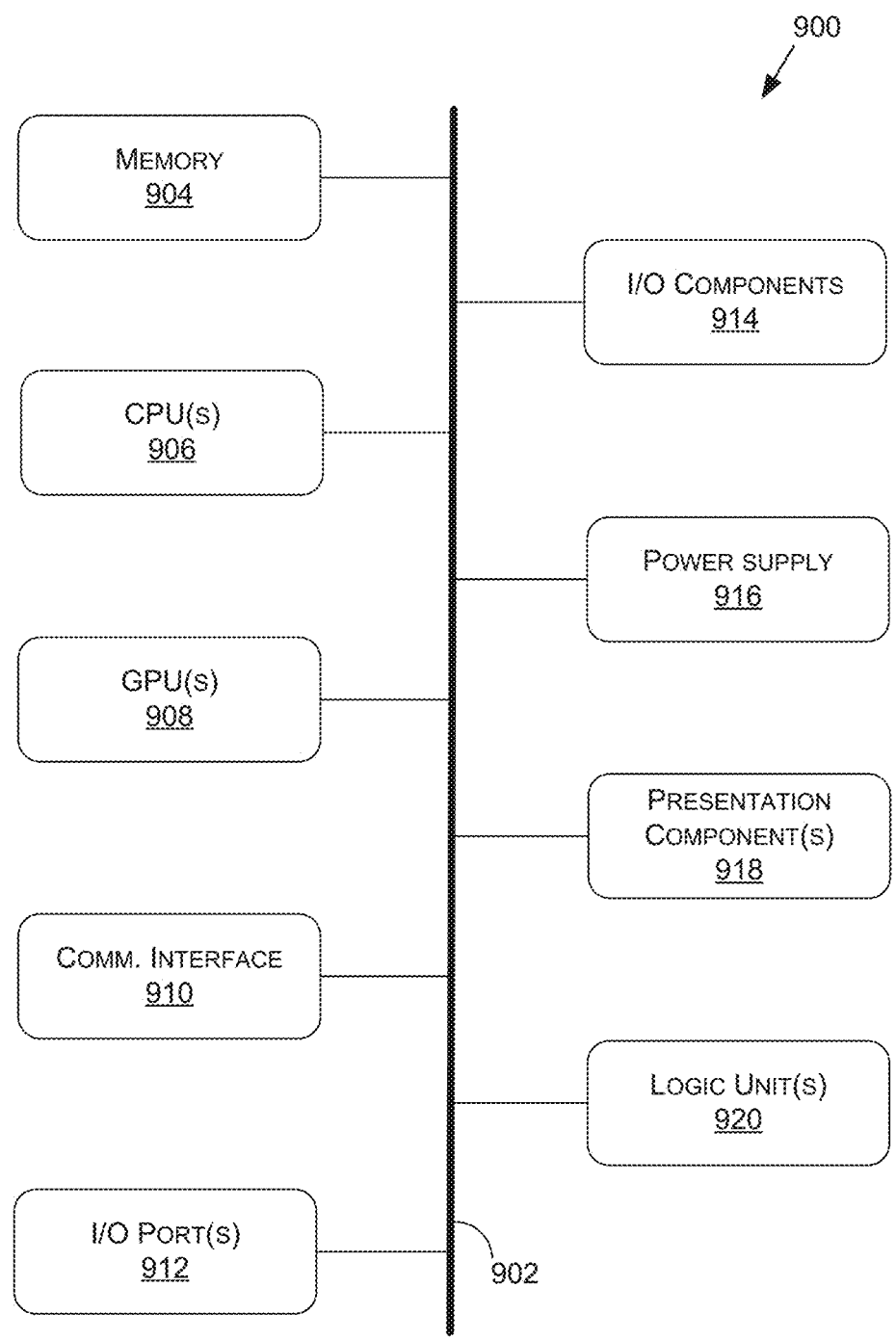
FIG. 9 is a block diagram of an example computing device suitable for use in implementing some embodiments of the present disclosure.

The sensor controller 104 may output sensor data 106 to a computing system 108, such as a computing system executing within vehicle 800 and/or example computing device 900 of FIG. 9. The sensor data 106 may be in any of various forms, such as, without limitation, a 3D LiDAR point cloud. The sensor data 106 may be analyzed to perform various functions related thereto and may be used in conjunction with other sensor data 106 (such as the various sensors shown in FIGS. 8A-8C and discussed herein). In embodiments where LiDAR sensor is used, the sensor data 106 may be referred to as LiDAR data; however, in other embodiments of the present disclosure the sensor data 106 may be another type of depth data (e.g., from RADAR, ultrasonic, etc.).

The system 100 may include a coordinate converter 110 that may convert sensor data 106 into different formats, reference frames (e.g., from 3D to 2D, or 2.5D, etc.), and/or types (e.g., from point clouds to projection, or range images). As a non-limiting example, the coordinate converter 110 may convert LiDAR data representative of a 3D point cloud to a 2D range image or other projection image type, and a depth flow generator may analyze depth information between frames to generate a "2.5D" depth flow image using the depth flow image generator 112. In some embodiments, the coordinate converter 110 may convert the one or more range images to the same coordinate system (based upon known or tracked motion of the vehicle 800 (e.g., ego-motion)) and, after analysis for optical flow, message passing, etc. in 2.5D space, the coordinate converter 110 may convert the resulting 2.5D depth flow image to a 3D scene flow representation.

Figure 5:
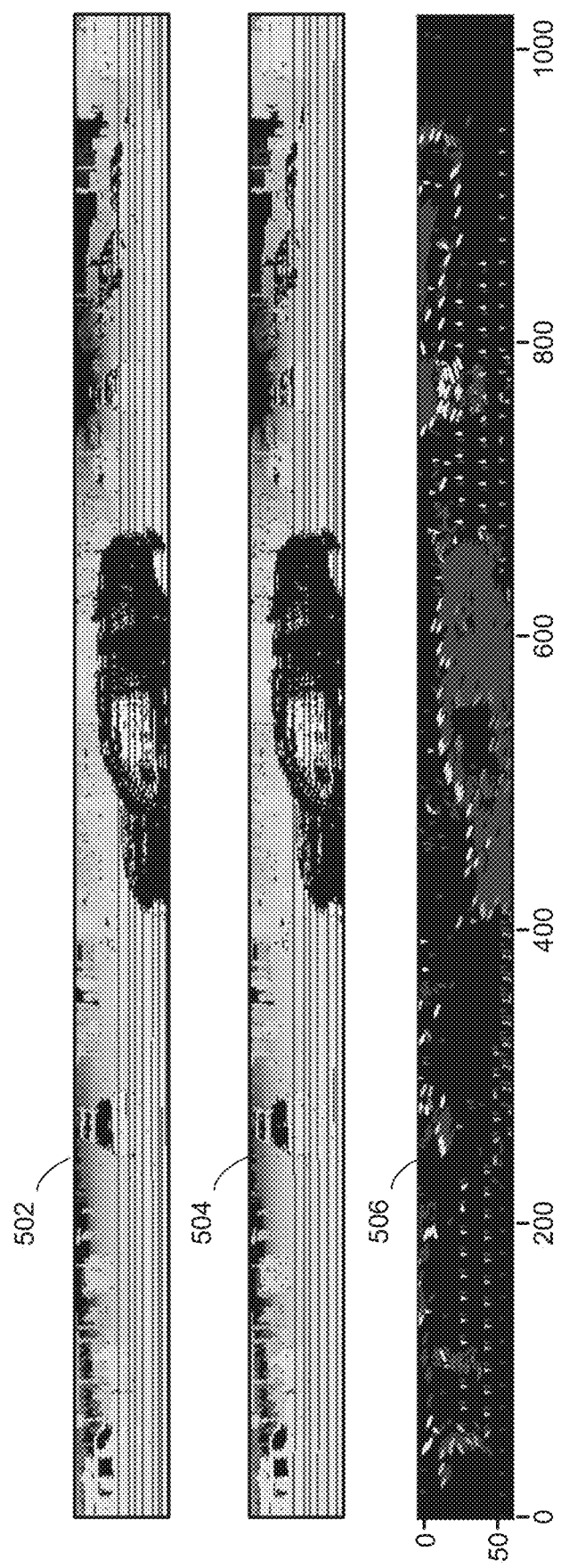
FIG. 5 is a diagram showing two consecutive LiDAR range images and a resultant depth flow image, in accordance with some embodiments of the present disclosure.

The system 100 may further include the depth flow generator 116 that may create an depth flow image(s) using one or more sets of sensor data 106. Range images, as shown in FIG. 5, may be generated from LiDAR data using one or more LiDAR sensors. A first set of LiDAR data 502 captured at a time T1 and a second set of LiDAR data 504 captured at a time T2 are shown in FIG. 5. For example, sets of LiDAR data may represent a spherical projection or other projection type extending from the depth perception sensor 102. The LiDAR sensors may continuously generate the LiDAR data such that numerous sets of LiDAR data are generated. Each such set may be indicative of a single sweep, revolution, or other capture of the LiDAR sensor, and the sets of LiDAR data may be separated by a time interval. In some embodiments, to generate the optical or depth flow images, the depth flow image generator 112 may use a second (e.g., current or most recent) set of LiDAR data 504 and compare it to a previous set of LiDAR data 502 to determine various information from the data, as discussed herein. In some embodiments, two consecutive sets of LiDAR data may be analyzed; however, this is not intended to be limiting and the analyzed sets of LiDAR data may correspond to different arrangements other than consecutive frames.

In some embodiments, the optical or depth flow image may be a simplified "2.5D" rendering of 3D information, where pixels (e.g., each pixel) have a coordinate (e.g., an (x, y) coordinate, indicative of, for example, an azimuth and an elevation, respectively) and one or more associated variables, such as depth and/or depth flow. By reducing the 3D representation to a 2D or 2.5D representation, compute and run time may be reduced.

In some embodiments, the depth flow image generator 112 may generate a first range image based at least in part on first LiDAR data generated using one or more LiDAR sensors at a time, T1. The first range image may be generated such that pixels of the image include depth flow values—e.g., indicative of the change in depth values across frames. Similarly, the depth flow image generator 112 may generate a second range image based at least in part on second LiDAR data generated using the one or more LiDAR sensors at a time, T2, subsequent T1. The first range image and the second range image may then be stored, analyzed, and/or compared to each other (as well as to third depth flow images, fourth depth flow images, etc.), such as described herein.

In embodiments of the present disclosure, the range images may be generated using LiDAR range images generated using data representative of one or more LiDAR point clouds. The LiDAR point clouds, as discussed herein, may correspond to the raw data output by the LiDAR sensor(s) (and/or the LiDAR controller). The LiDAR data may represent any combination of various variables associated with the transmitted and received signals, such as, without limitation, reflectivity information, texture information, time of flight (ToF) information, color information, and/or intensity information.

The complex 3D LiDAR data (e.g., representative of a 3D point cloud) may be simplified to a 2D LiDAR range image (or other projection image type), and may also be encoded with additional information (such as depth flow) to generate a 2.5D depth flow image that allows for rapid analysis. In some embodiments, the depth flow image may also be reduced in resolution using a pyramid or multi-scale approach to aid in identifying optical flow information more quickly, especially where larger movement is occurring between frames (such as would be occurring for depth perception sensors 102 on an autonomous vehicle operating at highway speeds). The depth flow image may include a set of pixels, each with a set of 2D coordinates and a depth flow. The depth flow may be stored as a label on the pixel, in embodiments.

The simplified depth flow representation may be used in processing for scene flow in place of the more complex 3D LiDAR point cloud data. The simplified calculations may allow for the analysis discussed herein to be performed in real time, and the results may be projected back to 3D space such that accurate 3D scene flow information is generated with less compute and processing time.

Figure 2:
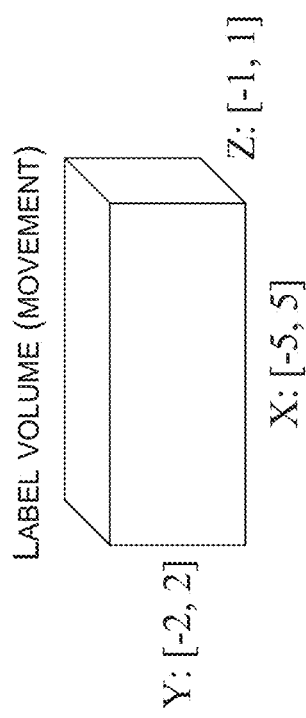
FIG. 2 is a diagram showing labels on an example pixel volume, illustrating image displacement and depth flow, in accordance with some embodiments of the present disclosure.
Figure 3:
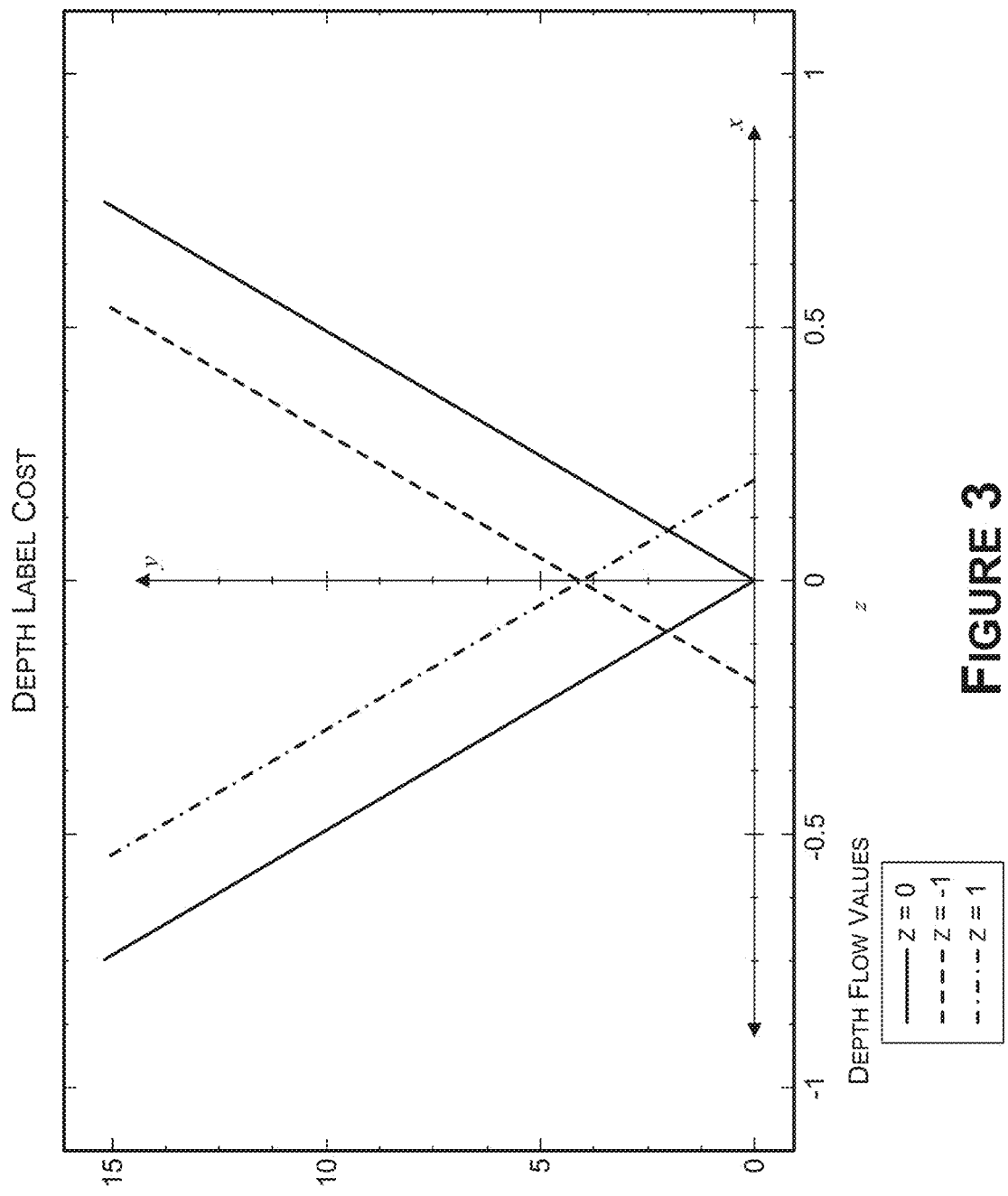
FIG. 3 is a diagram illustrating an example cost function for message passing with respect to depth flow, in accordance with some embodiments of the present disclosure.
Figure 4:
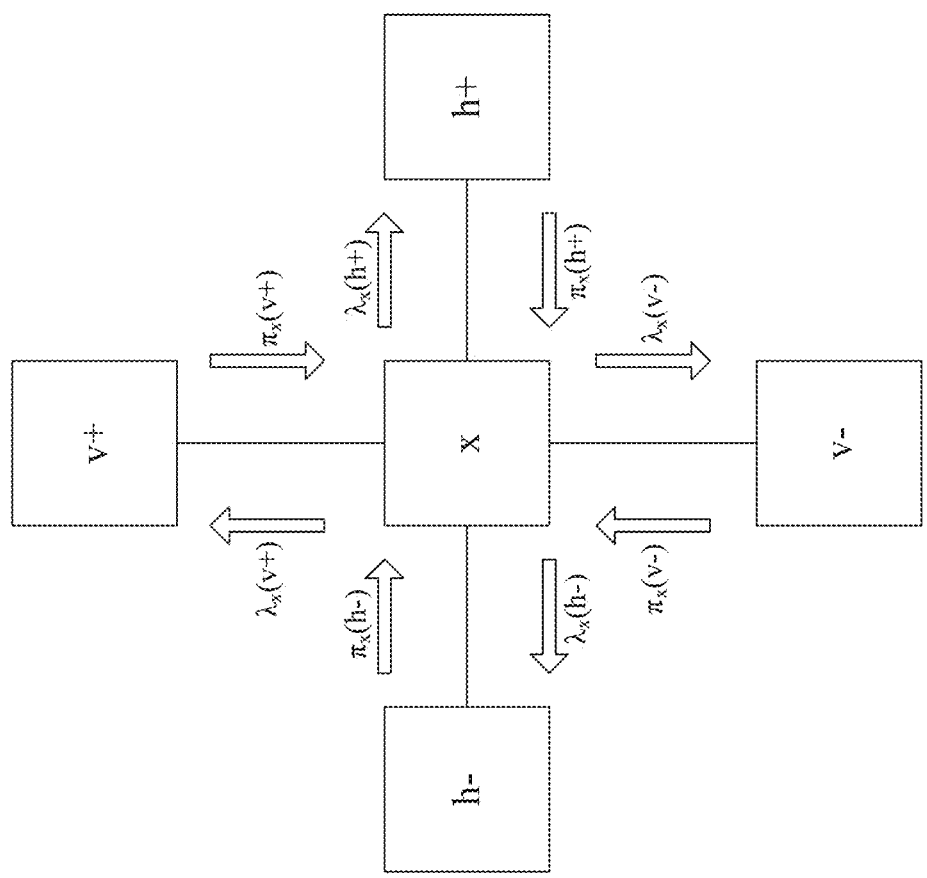
FIG. 4 is a diagram illustrating message passing between a pixel node and neighboring pixel nodes, in accordance with some embodiments of the present disclosure.

The system 100 may include a belief propagator 114 that may identify or assign pixels with one or more properties, such as illustrated in FIG. 2. For example, the belief propagator 114 may pass messages, as illustrated in FIG. 3, between pixels (e.g., pixel nodes of a representation of the pixels, such as a matrix, graph, table, etc.) of the depth flow image to refine and analyze the information therein. In some embodiments, a cost may be assigned to pixels, as shown in FIG. 4.

As such, embodiments of the present disclosure may use a belief propagation algorithm to pass messages between adjacent pixels (e.g., pixel nodes) of the depth flow image(s). In general, belief propagation may include a message-passing algorithm for inferring information from graphical models. While belief propagation can be exact in some cases, it is often used for approximations. For example, the precise information of the LiDAR data is simplified to the depth flow image, the message passing approximates the values of neighboring pixels, and the approximated values are returned to the coordinate space of the generated LiDAR data. The simplification, message passing, and return can be performed more quickly than doing the complete analysis in full 3D, while allowing for sufficient definiteness in obstacle detection, identification, and/or tracking.

To aid the belief propagation algorithm in passing messages between the adjacent pixels (e.g., pixel nodes of a pixel representation), labels may be associated with the pixels that include information that may be relevant to the adjacent pixels. It should be appreciated that "pixels" as used herein may refer to any subdivision of the depth flow image, and may correspond to nodes representing the pixels or subdivision thereof in a representation of the depth flow image (e.g., a matrix, table, graph, etc.). The resolution of the individual pixels may be reduced to allow for faster processing. Similarly, groups of pixels may be grouped together—e.g., messages may be passed between groups of adjacent pixels, rather than from pixel to pixel, in embodiments.

With reference to FIG. 2, FIG. 2 illustrates example labels that may be associated with pixels. For example, the belief propagation labels may correspond to a 2.5D rectangular block. The labels shown may represent the image displacement and depth flow, where the label volume may correspond to movement in a Z-direction (e.g., toward and away from the depth perception sensor 102).

In some embodiments, the depth flow may be simplified to a set of labels indicative of motion toward the sensor, motion away from the sensor, and no motion toward or away (e.g., stationary). For example, these depth flow values (Z in FIG. 2) may be represented as a $-1$, $+1$, and 0, respectively. In some non-limiting embodiments, these simplified data flow labels may be known as ternary labels that use a balanced ternary logic. In some embodiments, the depth flow may be a simplified set of labels indicative of rapid motion toward the sensor, slow motion toward the sensor, no motion relative to the sensor, slow motion away from the sensor, and rapid motion away from the sensor. For example, the depth flow values may be represented as a $-2$, $-1$, 0, $+1$, and $+2$, respectively (not illustrated). However, these labels are for example purposes only, and in other embodiments different label types may be used to represent the depth flow—or change in depth—between frames.

With reference to FIG. 3, FIG. 3 illustrates another label type that may be associated with pixels. For example, FIG. 3 illustrates an example graph depicting a calculation of a cost function for a depth flow data term. The x-axis of the graph in FIG. 3 corresponds to the difference in depth that is detected for that pixel, and the y-axis of the graph in FIG. 3 corresponds to an associated cost. As a first example, if the depth difference is 0.0 and the depth flow value is 0, a cost of 0 will be assigned indicating that if a corresponding physical object is not moving and two adjacent pixels are at the same distance, the cost will be very low. As a second example, if the depth difference is 0.125 (at the first tick mark on FIG. 3), the lowest cost depth flow label will be associated with Z=1, second lowest cost will be associated with Z=0, and highest cost will be associated with Z=−1. The cost will be selected as the y-value at the appropriate depth flow value for that pixel and the corresponding depth flow for that pixel. It should be appreciated that the y-values shown on the graph, as well as the slopes of the corresponding plots, are for example purposes only, and the actual cost values and depth label functions may vary based on any number of factors.

Once the labels are assigned, the pixels may pass messages between themselves via the belief propagation algorithm, as shown in FIG. 4—e.g., nodes corresponding to the pixels may pass messages to adjacent nodes corresponding to adjacent or neighboring pixels. For example, the belief propagator 114 may pass one or more messages between pixels of the second set of pixels at least partially indicative of respective depth flow values of the pixels and respective costs of the pixels. In some embodiments, the one or more messages are passed using a belief propagation algorithm. Generally, messages at least partially indicative of the herein-discussed labels may be sent to adjacent pixels. The received messages may then be analyzed, specifically the image displacement and depth flow with associated cost may be compared to the corresponding values for that pixel. New messages may then be sent with refined values, and analyzed to further refine the values of the labels. After a certain threshold, the iterations of messages and analyses may cease. In some examples, the threshold may be a certain number of iterations, the passing of a certain time interval, achieving a certain threshold confidence level, a threshold associated with processor and/or memory capacity, and/or another threshold.

The use of the belief propagation algorithm may satisfy various constraints. For example, the belief propagation algorithm may identify which adjacent pixels correspond to the same physical object (e.g., the data term), and the belief propagation algorithm may "smooth" adjacent values so that adjacent pixels corresponding to the same physical object first have a similar resultant value (e.g., a smoothness term). As such, the belief propagation algorithm may determine, through the data term, which adjacent pixels correspond to the same physical object, and may determine, through the smoothness term, approximate values for the pixels associated with that physical object. Through multiple iterations of message passing and analysis across the same optical or depth flow image, determination of the physical objects and an approximation of their movement may be determined. Through multiple iterations across numerous consecutive depth flow images, new physical objects (such as those previously occluded or entering range of the depth perception sensor 102) may be identified and changes (such as a change in direction or speed) in previously identified physical objects may be determined and tracked.

In some embodiments, the messages may be sent between pixels (e.g., nodes corresponding to pixels) of the same depth flow image and carry information regarding the data term and the smoothness term. In some embodiments, the data term may be determined during a first set of iterations, and the smoothness term may be determined during subsequent iterations of the same depth flow image. In other embodiments, the data term and the smoothness term may be determined simultaneously. Specifically, the messages may include the depth flow information (to help identify a general direction in and out for identifying the correct pixels between images) and/or the cost (to help identify how much the pixels should influence their neighbors).

An example of the message passing is shown in FIG. 4. An example subject pixel "X" is shown at the center of FIG. 4. The subject pixel is adjacent to neighboring pixels in horizontal and vertical directions. In some embodiments, the subject pixel may also be adjacent to neighboring pixels in horizontal directions or other designations (not illustrated). In FIG. 4, the neighboring pixels in the vertical direction are labeled as v+(vertically above the subject pixel) and v− (vertically below the subject pixel). The neighboring pixels in the horizontal direction are labeled as h+(horizontally to the right of the subject pixel) and h− (horizontally to the left of the subject pixel). It should be appreciated that any pixel in the depth flow image may be designated as the subject pixel along with the corresponding neighboring pixels. For example, the pixel h+ in FIG. 4 may be designated as the subject pixel, which would have horizontal neighboring pixels as the pixel "x" as well as another pixel further to the right (not illustrated in FIG. 4). In addition, although referred to as pixels, the message passing may be between nodes or other representations of pixels in a graph, matrix, table, or other representation of the images.

Messages may be passed between the respective pixels. For example, the subject pixel may send messages to its neighboring pixels, and the messages may each include at least one label—or a portion thereof. The messages may, in embodiments, correspond to simple packets of information related to one or more labels associated with the respective pixel. By sharing the information with neighboring pixels, various aspects of the data may be determined, as discussed herein.

The outgoing messages may be labeled as in FIG. 4 with a lower-case lambda and a subscript of the pixel that the outgoing message is coming from, with the recipient of the message being added in parentheses (this convention being purely for example purposes). For example, an outgoing message from subject pixel x to its vertically upward neighbor may be designated as $\lambda_x(v+)$. The subject pixel may thus create and send four outgoing messages: $\lambda_x(v+)$, $\lambda_x(v-)$, $\lambda_x(h+)$, and $\lambda_x(h-)$. As discussed herein, in embodiments of the present disclosure, other messages (such as those to diagonally adjacent pixels) may also be sent. Outgoing messages may provide information about the current label or labels associated with the subject pixel. In some examples, the outgoing messages from a subject pixel (e.g., node corresponding to the subject pixel) to each adjacent pixel (e.g., nodes corresponding to adjacent pixels) may be similar or identical, because the label or labels associated with the subject pixel are all identical. In other embodiments, the contents of at least one outgoing message may be selected based upon one or more characteristic of the neighboring pixel.

The incoming messages are labeled in FIG. 4 with a lower-case pi and a subscript of the pixel that the incoming message is coming to, with the sender of the message being added in parentheses (this convention being purely for example purposes). For example, an incoming message to the subject pixel x from its horizontally right neighbor may be designated as $\pi_x(h+)$. The subject pixels thus receives four incoming messages: $\pi_x(h+)$, $\pi_x(h-)$, $\pi_x(v+)$, and $\pi_x(v-)$. As discussed herein, in embodiments of the present disclosure, other messages (such as those from diagonally adjacent pixels) may also be received. Incoming messages provide information about the current label or labels associated with the neighboring pixels. In some embodiments, the contents of one or more of the outgoing messages are distinct, because the label or labels associated with the neighboring pixels are independent.

It should also be appreciated a single message may be designated differently based upon the perspective of the pixels involved. For example, the outgoing message $\lambda_x(v+)$ is also an incoming message from the perspective of the pixel v+. Similarly, the incoming message $\pi_x(h+)$ is also an outgoing message from the perspective of the pixel h+. The incoming message $\pi_x(h+)$ may also be similar or identical to other messages sent by the pixel h+ to its neighboring pixels.

As discussed herein, the data term identifies which adjacent pixels correspond to the same physical object and the smoothness term adjusts adjacent values so that adjacent pixels corresponding to the same physical object first have a similar resultant value. In embodiments, the belief propagator 114 may calculate, based on the one or more messages, one or more data terms indicative of one or more of the first set of pixels in the first range image that corresponds with one or more of the second set of pixels in the second range image. The data term may be used because the physical object and/or the depth sensors are moving between images. Variables such as the depth flow, reflectivity, color values, intensity, time of flight (ToF), texture, return behavior, and/or other information (such as those represented by LiDAR data, or represented in LiDAR range images) may be analyzed in the data term. In examples, a physical object may be relatively constant for one or more of these variables. For example, a physical object may move with a similar depth flow because the physical object moves as a single unit. As another example, the reflectivity may vary based upon the physical object (e.g., a painted vehicle may have a higher reflectivity value than a pedestrian).

In embodiments, the belief propagator 114 calculates, based at least in part on the one or more messages, one or more smoothness terms indicative of revised depth flow values for the set of pixels in the depth flow image. The smoothness term may identify which value for depth flow is approximately correct for pixels that correspond with the same physical object. Typically, a physical object moving in space moves as a single unit. Thus, the incomplete and imprecise data of some pixels can be adjusted and influenced by neighboring pixels to account for this information. For example, a cost is assigned to each pixel based upon how reliable the data therein is. For pixels with incomplete data (for example, no return to the LiDAR sensor), a low cost may be assigned such that they are more likely to be influenced by their neighboring pixels by the belief propagation algorithm. This allows a dense motion field to be created despite missing data from the original LiDAR scan.

In some embodiments, the belief propagator 114 may prevent passing of messages across boundaries that correspond to disparate physical objects. Whether any two adjacent pixels correspond to the same object may be calculated by comparing the relative depth and/or depth flow associated with the two respective pixels. Adjacent pixels that are calculated to not correspond to the same physical object in the physical environment (such as because a detected difference in depth or reflectivity between the two pixels exceeds a certain threshold) may not pass messages between one another (e.g., messages may not be passed between nodes corresponding to the pixels in a representation of the image, such as a matrix, table, graph, etc.). This is because these pixels should not influence their neighboring pixels as they correspond to different physical objects. Thus, disparity between these neighboring pixels may not be influenced by the belief propagation algorithm.

In some embodiments, the belief propagator 114 may determine, based at least in part on depth data from the second LiDAR data, that the subject pixel corresponds to a subject object that is distinct from a neighboring object that corresponds to the neighboring pixel. Based on this determination, passing of a message between the subject pixel and the neighboring pixel may be stopped or prevented. For example, the preventing the passing of messages may be performed by determining (before sending a message) whether the pixels involved correspond to the same physical object. In other embodiments, the preventing the passing of messages may be done by placing a virtual barrier around pixels that correspond to the same object, such that the determination does not need to be performed again in subsequent iterations of the process. In still other embodiments, the preventing the passing of messages may be performed by adding a label to at least one pixel indicative of the physical object (such as an object reference number or other indicator). In this embodiment, the messages may be passed but the received messages ignored if the label does not correspond to the same object to which the subject pixel corresponds.

The system 100 may include a scene flow generator 116 that may—e.g., using the coordinate converter 110—convert the 2.5D optical or depth flow information (e.g., after message passing) back to 3D space to generate a scene flow. For example, through the passing and analysis of these messages between pixels (e.g., nodes corresponding to pixels in a representation of the depth flow image) of the same depth flow image, accuracy of the various data at each pixel will be improved to a refined 2D motion vector. The refined 2D motion vector may be indicative of an optical and/or depth flow change for the physical object that corresponds with the subject pixel. Missing or incomplete data for other pixels can also be estimated and refined based at least in part of the refined 2D motion vector.

The scene flow generator 116 may, based at least in part on the one or more data terms and the one or more smoothness terms, compute one or more motion vectors corresponding to the second set of pixels, where the one or more motion vectors may be representative of relative pixel positions between the first range image and the second range image. The relative pixel position may be indicative of movement of the physical object in proximity of the depth perception sensor 102 in the environment.

In embodiments of the present disclosure, the scene flow generator 116 may calculate or compute the one or more motion vectors in 2D or 2.5D space, and then convert the one or more motion vectors to 3D space to generate one or more 3D motion vectors. In embodiments, the processor converts the determined 2D motion vector to a 3D space, based at least in part upon the information in the 2D vector and the corresponding LiDAR data for that 2D vector. The 2D vectors, which may also be referred to as 2.5D motion vectors because they include depth information, may be converted back to 3D space using known correspondence between 2D image space and 3D world space locations (e.g., using intrinsic and/or extrinsic sensor parameters). As such, a 3D motion vector for points in the LiDAR point clouds may be calculated, where the 3D motion vectors represent various information about the displacement of the 3D points of the point cloud—e.g., indicating displacement of physical objects across frames of the LiDAR data. Thus, the message-passing belief propagation algorithm allows for this complex analysis to be simplified and completed before returning to the 3D space, and then converting to 3D space to generate 3D scene flow information.

As such, the scene flow generator 116 may generate a scene flow based at least in part on the one or more 3D motion vectors that represent a scene flow between the first range image and the second range image. The scene flow may be used to detect, identify, and/or track various physical objects within an environment of the vehicle 800—e.g., within the field of view or sensory field of the depth perception sensors 102.

Figure 6A:
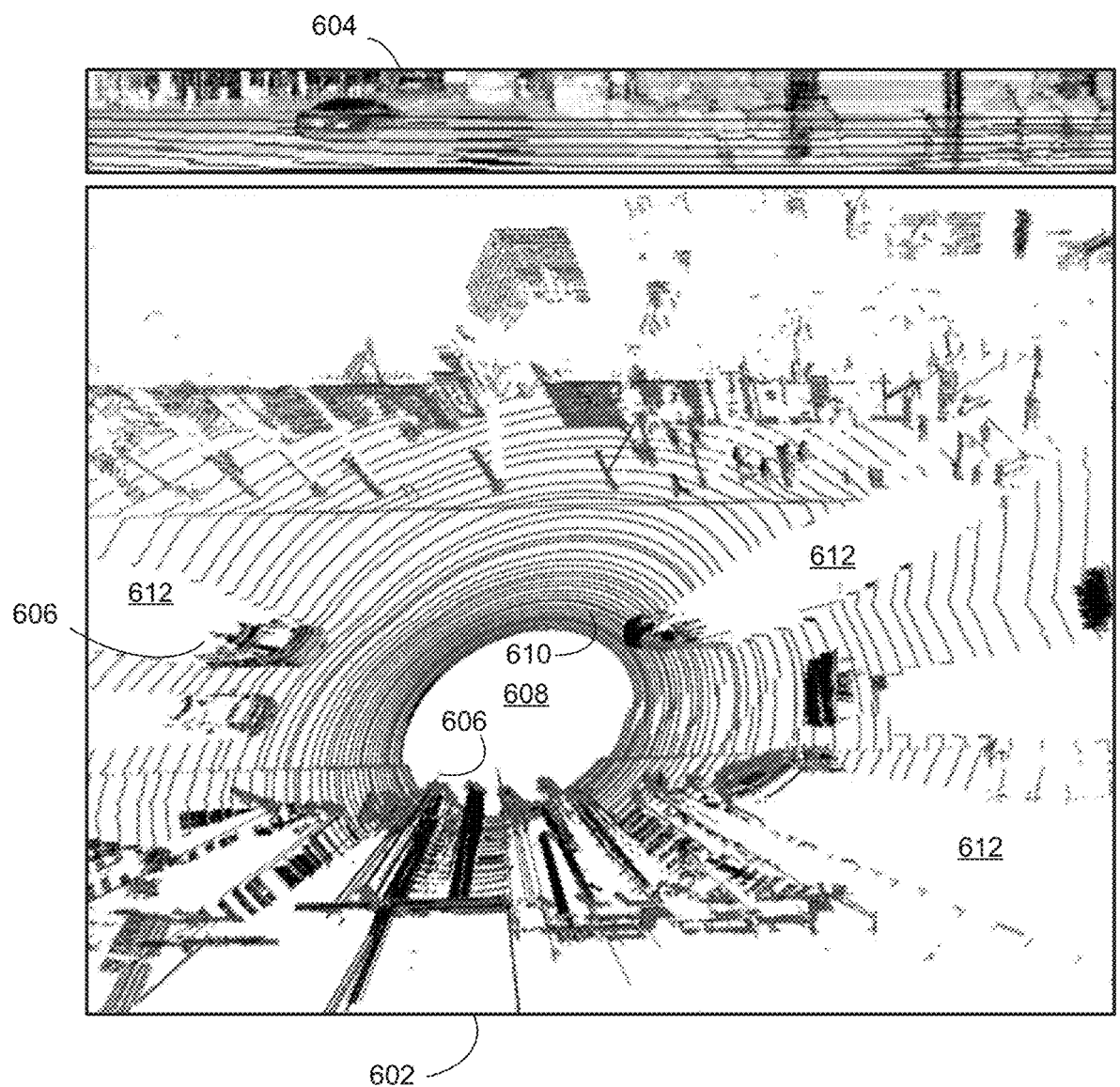
FIGS. 6A and 6B are diagrams showing resultant scene flows generated from depth flow images, in accordance with some embodiments of the present disclosure.
Figure 6B:
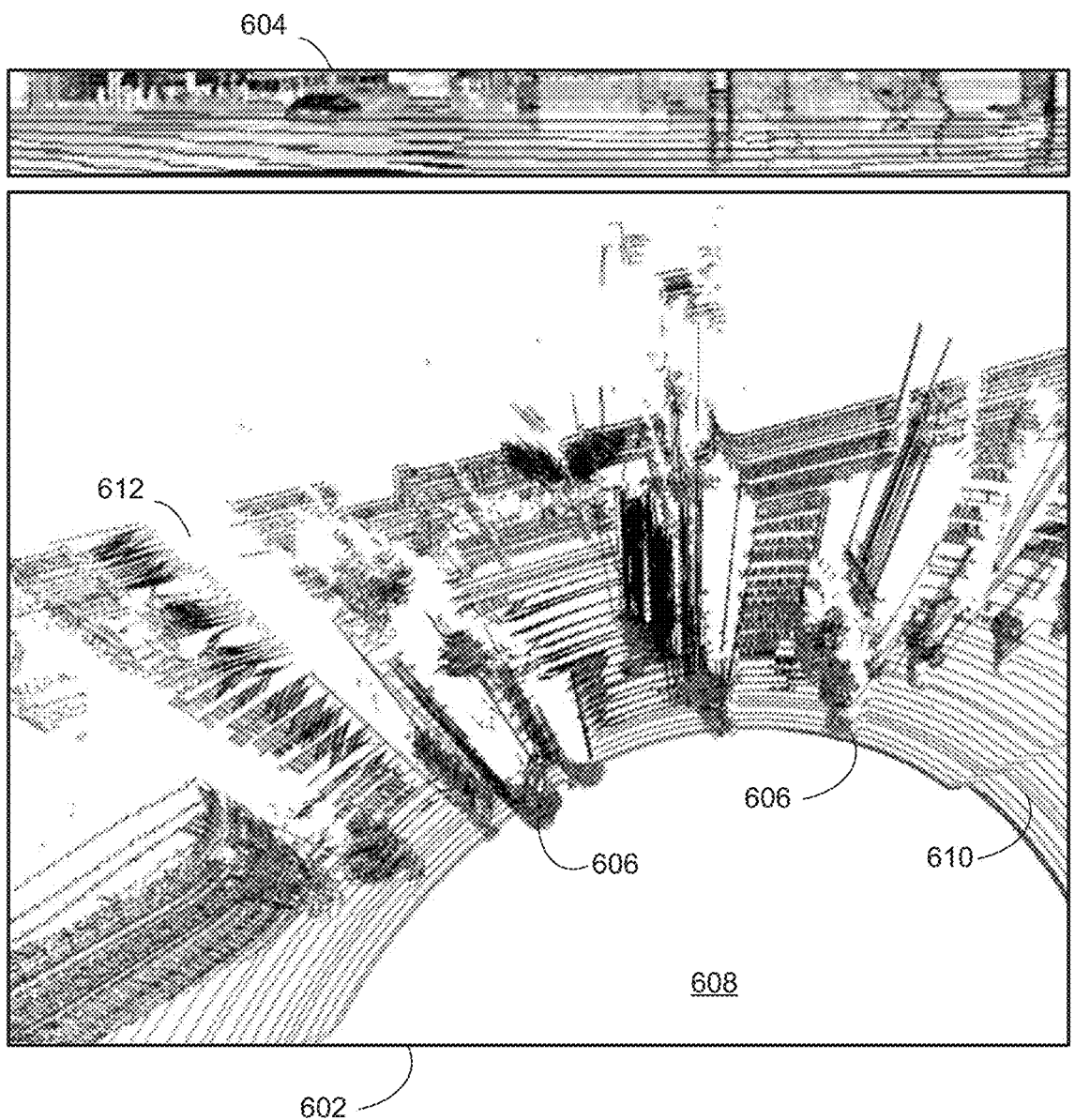

With reference to FIG. 6A-6B, example scene flows 602 are presented, along with a corresponding range image 604. For example, FIG. 6A shows an example scene flow 602 from a first orientation and FIG. 6B shows the example scene flow 602 from FIG. 6A from a second orientation (e.g., and zoomed in). The example scene flow 602 shows the detected objects 606 and an indication of the corresponding movements of the detected objects. For example, the scene flow 602 includes a central region 608 that is unpopulated and corresponds to a location of the depth perception sensor 102 (though not illustrated in FIG. 6A or FIG. 6B) as well as a radius extending therefrom. At the edge of the central region 608 are a series of concentric circles 610 that may indicate that information is available for this area but no obstacle is detected. Where obstacles 606 are detected, there may be an obstruction in the concentric circles 610 and behind the obstacles 606 (from the perspective of the depth perception sensor 102) there may be occluded regions 612 (indicated by blank white spaces). Occluded objects may become visible in additional iterations of the process, as the obstacles and/or the perception sensors move relative to one another thereby removing the occlusions.

With reference to FIG. 1A, the system 100 may include a vehicle controller 118 that may analyze the information in the scene flow to determine obstacles in the physical environment surrounding the depth perception sensor 102. The vehicle controller 118 may then instruct one or more vehicle actions based upon the determined obstacle, such as actuating a brake or turning the vehicle. For example, the vehicle controller 118 may execute an autonomous driving software stack that may include a perception layer, a world model management layer, a planning layer, a control layer, an actuation layer, an obstacle avoidance layer, and/or one or more other layers.

Figure 1B:
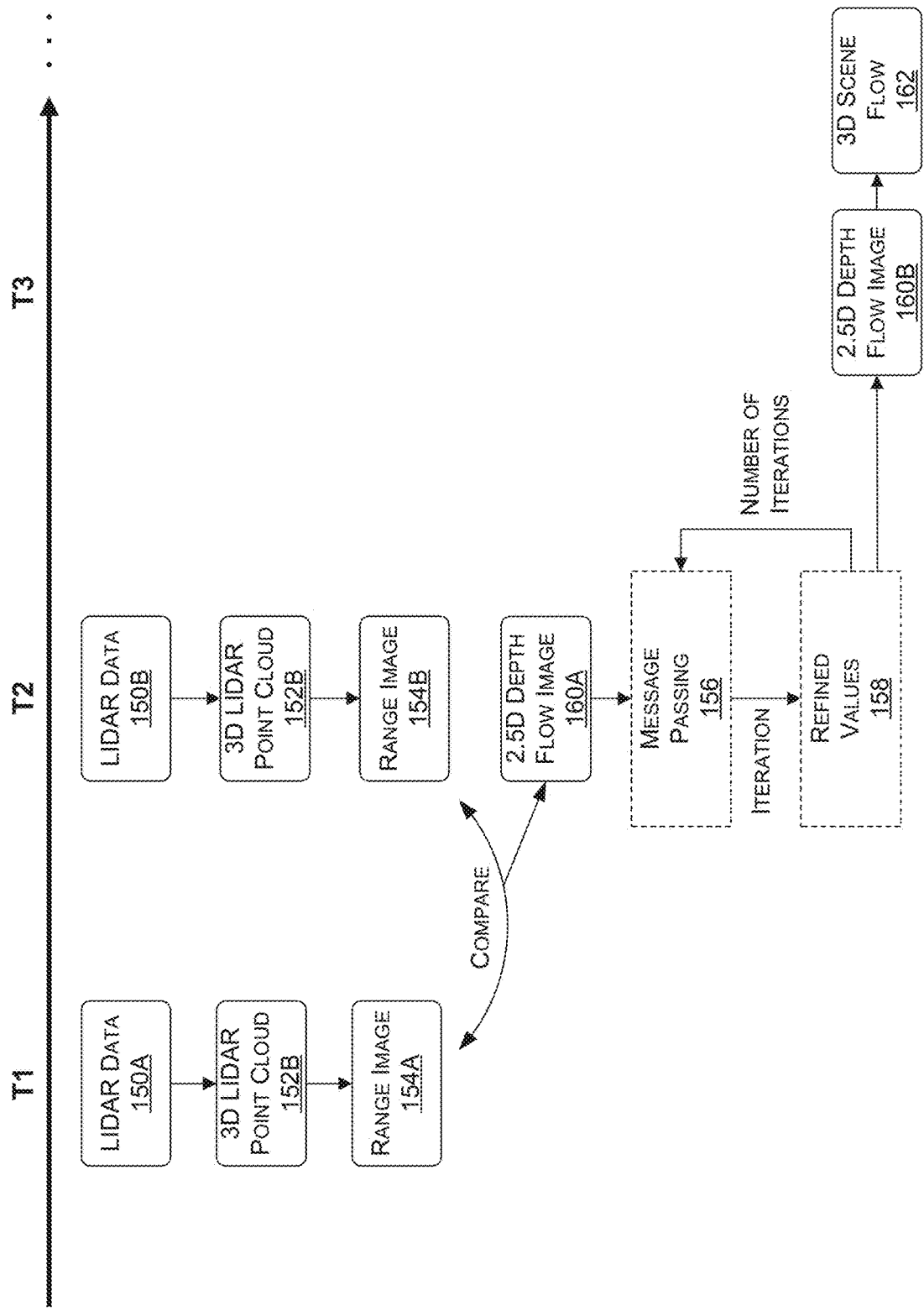
FIG. 1B is a time-flow diagram illustrating a process for scene flow generation, in accordance with some embodiments of the present disclosure.

Now referring to FIG. 1B, FIG. 1B shows a time-flow diagram illustrating an example embodiment of the system 100 over a time interval. For example, as shown in FIG. 1B, at a time T1 during operation of the system 100, LiDAR data 150 is collected. The LiDAR data 150 is consolidated into a 3D LiDAR point cloud 152, the 3D LiDAR point cloud is projected to generate a range image. An example range image is shown in FIG. 5 At a time T2 (that is subsequent to the time T1) the LiDAR data 150 is again collected and consolidated into a second 3D LiDAR point cloud 152, the LiDAR point cloud is projected to generate a range image, and the one or more range images are used to generate a second 2.5D depth flow image 154. In this 2.5D depth flow image 154, the various pixels (e.g., nodes corresponding to the pixels) may pass messages there between via a message passing algorithm 156. As the messages are passed in a first iteration, the values of the depth flow (and possibly other labels and values) may be refined to produce refined values 158 and compared to the range images. After a certain number of iterations, a 2.5D depth flow image 160 and a 3D scene flow 162 may be generated. LiDAR data collected at a time T3 (not illustrated) will be further processed and compared to the data from the time T2 to further refine the 3D scene flow over time.

Figure 7:
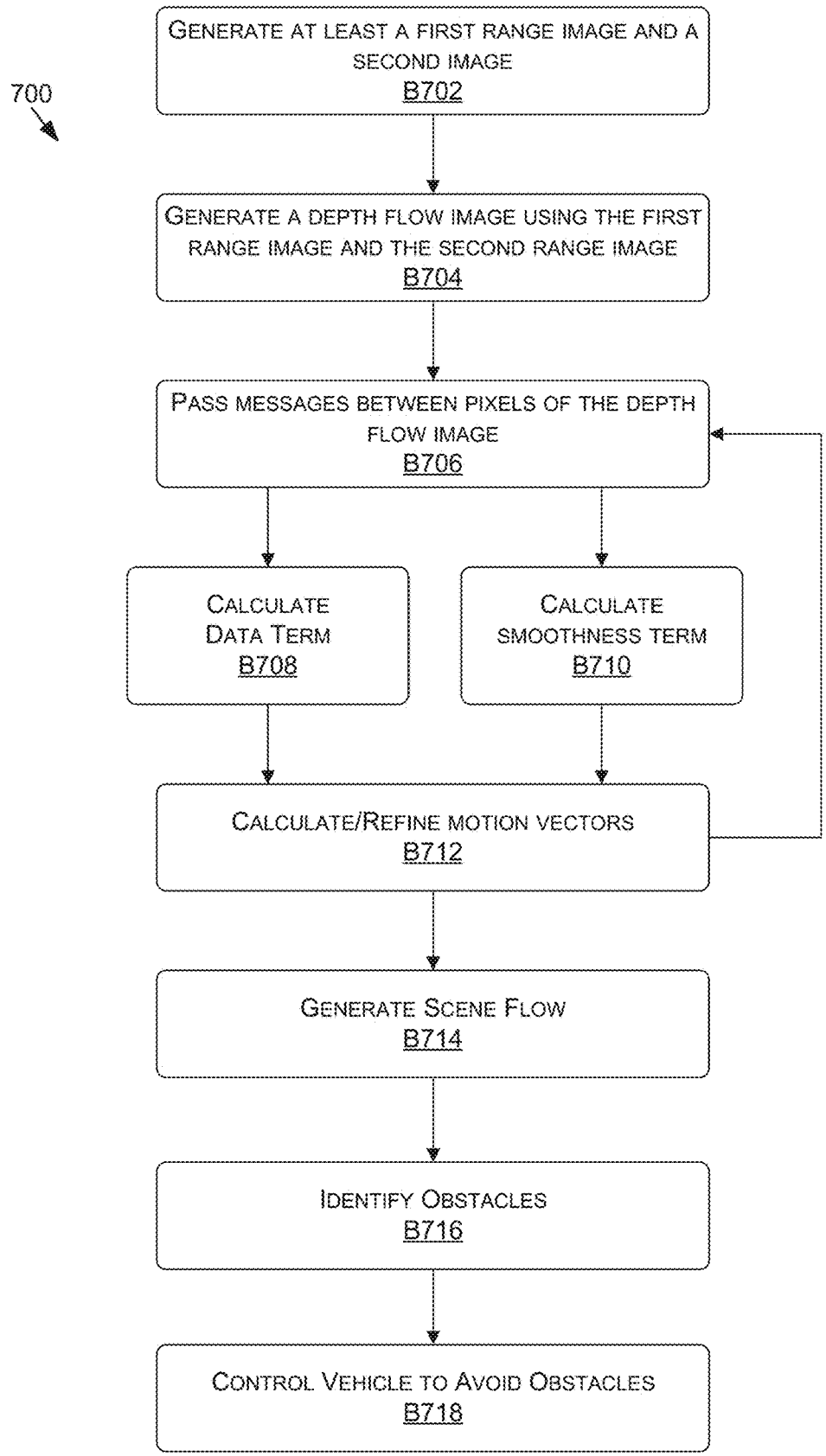
FIG. 7 is a flow diagram illustrating a method for scene flow generation using belief propagation, in accordance with some embodiments of the present disclosure.

Now referring to FIG. 7, each block of method 700, described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. In addition, method 700 is described, by way of example, with respect to the scene flow generation system 100 of FIG. 1A. However, this method may additionally or alternatively be executed by any one system, or any combination of systems, including, but not limited to, those described herein.

FIG. 7 is a flow diagram showing a method 700 for generating a scene flow, in accordance with some embodiments of the present disclosure. The method 700, at block B702, includes generating at least a first range image and a second range image. For example, a first range image corresponding to a first set of LiDAR data generated at a first time and a second range image corresponding to a second set of LiDAR data at a second time subsequent the first time may be generated. The range images may encode various information, such as depth, intensity, ToF, etc.

The method 700, at block B704, includes generating a depth flow image using the first range image and the second range image. For example, at least depth values corresponding to the first range image and the second range image may be compared to determine depth flow values—indicating changes in depth for particular (e.g., matched) pixels or points in the range images over time. To compare the two range images, one of the range images may be converted to a coordinate space of the other range image, where the conversion may be executed using tracked ego-motion of the vehicle 800 between the capturing of the first LiDAR data and the second LiDAR data used to generate the range images.

The method 700, at block B706, includes passing messages between pixels of the depth flow image. For example, to update the values in the depth flow image and/or to fill in missing information for missing or incomplete data, messages may be passed via a belief propagation algorithm between nodes corresponding to pixels of a representation of the image (e.g., a matrix, graph, table, etc.).

The method 700, at block B708, includes calculating a data term indicative of what pixels correspond to what physical objects, which may include a comparison to the first depth flow image.

The method 700, at block B710, includes calculating a smoothness term that adjusts values of the labels based upon information received from the neighboring pixels.

The method 700, at block B712, includes calculating and/or refining motion vectors based at least in part on the data term and the smoothness term. In some embodiments, the method 700 may include multiple iterations of a loop of blocks B706 through B712, in which the smoothness term adjusts the values while the data term identifies the objects.

After a certain threshold, the method 700, at block B714, may include generating scene flow based on the motion vectors. For example, the scene flow may be generated from 3D motion vectors determined by converting 2.5D motion vectors to 3D space.

The method 700, at block B716, includes identifying obstacles based at least in part on the scene flow. For example, obstacles may include physical objects that may affect the autonomous vehicle 800, either directly or indirectly. As such, obstacles may be in motion, such as other vehicles or pedestrians, or may be stationary, such as buildings and trees. The obstacles may have a position relative to the vehicle, a 3D motion vector (which may include an acceleration, rotation, or other motion indication), and a relative size (based upon how many pixels correspond with the obstacle). In some embodiments, based at least in part on the information about the obstacle, the system 100 may determine a likelihood that the obstacle will affect the vehicle, and the system may determine one or more remedial actions to be performed so as to avoid the obstacle. For example, the vehicle controller 118 may determine that the vehicle should brake, turn, or accelerate to avoid the obstacle. In instances where an obstacle cannot be avoided, the system 100 may determine that one or more remedial actions should be taken, such as minimizing damage or activating other safety features.

The method 700, at block 718, includes controlling the vehicle to avoid the obstacles identified by taking the one or more remedial actions identified. The controlling the vehicle may include sending a command to any of numerous vehicle systems, such as those described with respect to FIGS. 8A-8D.

Example Autonomous Vehicle

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMM), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
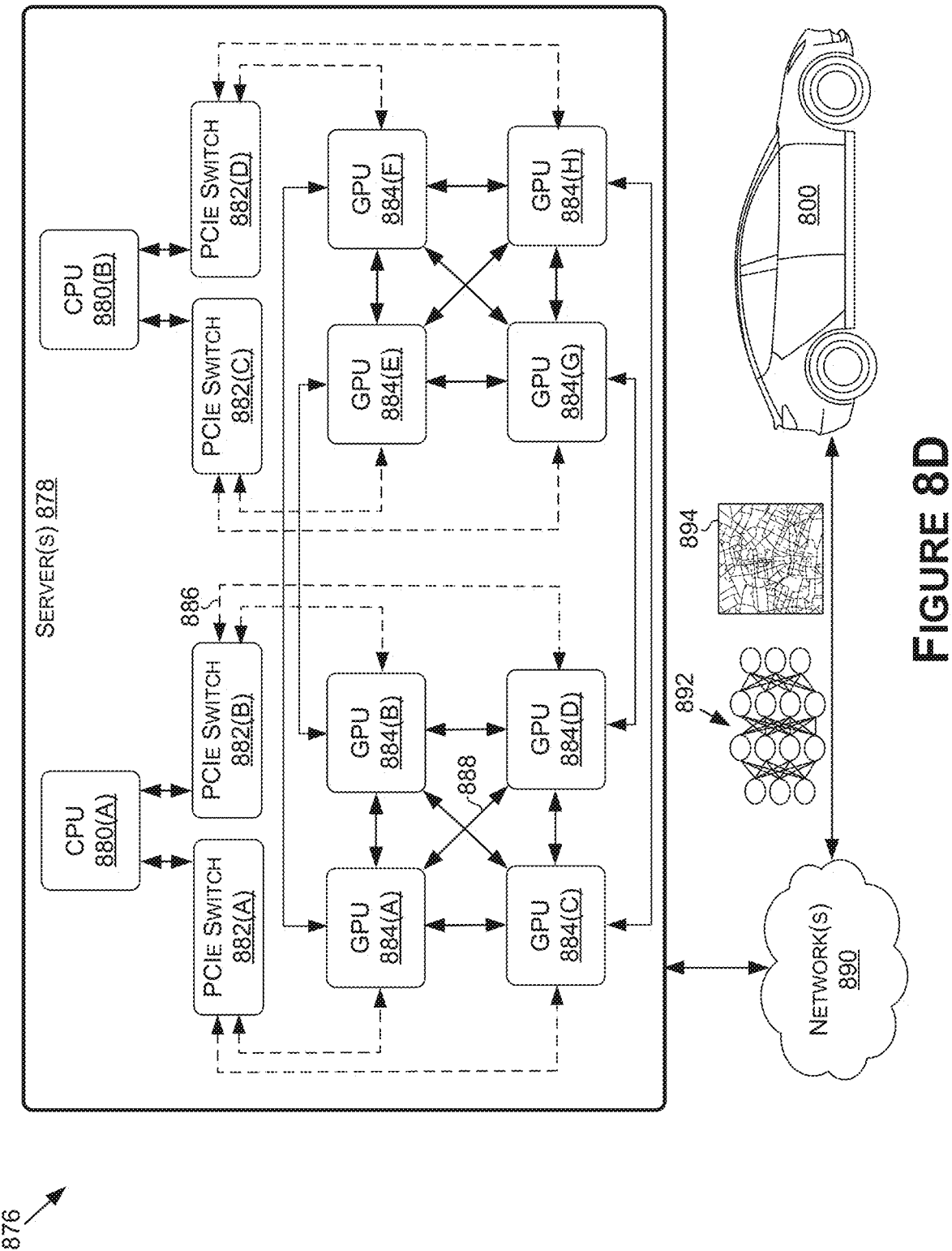
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

Example Data Center

Figure 10:
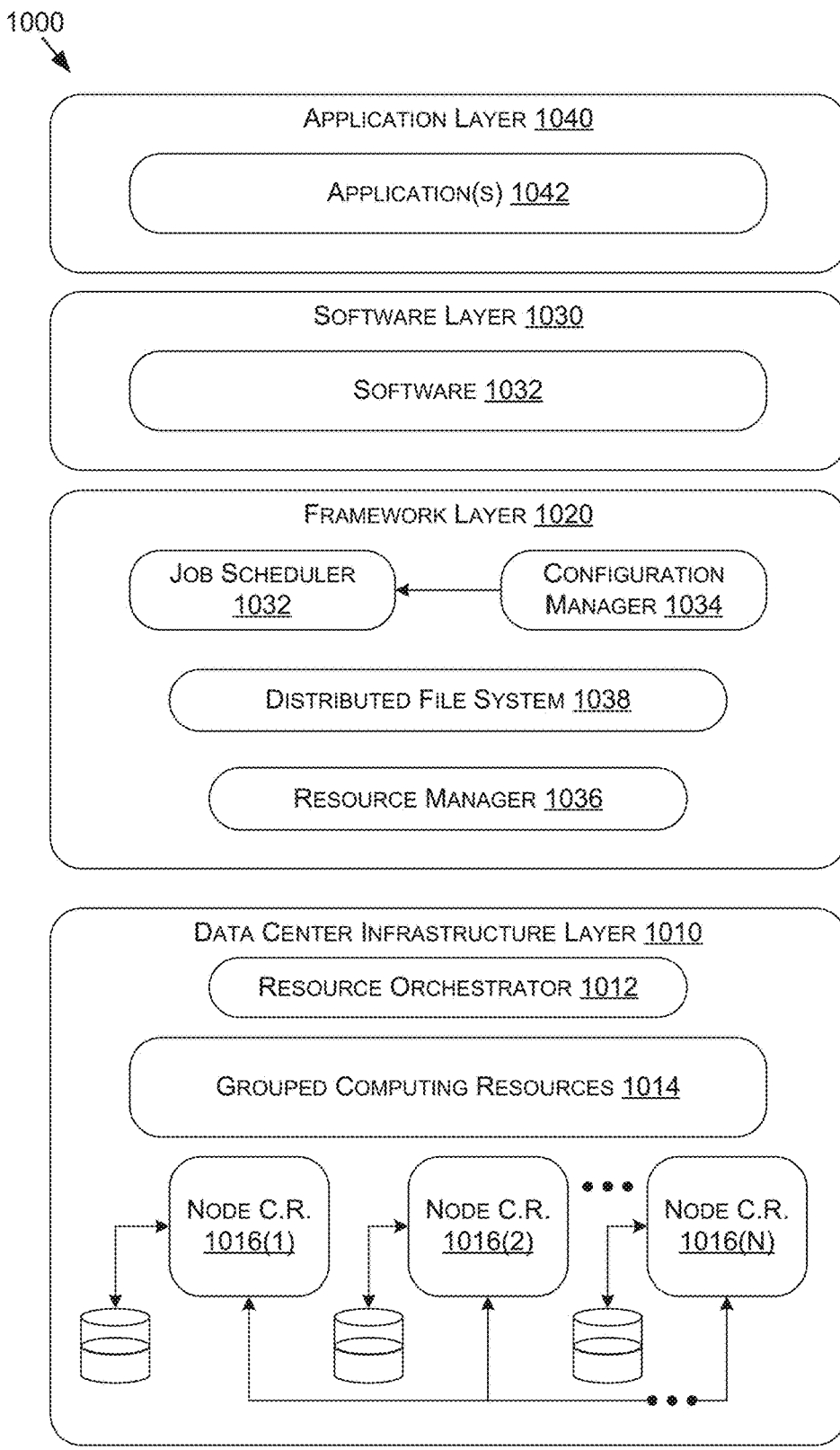
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1022 may configure or otherwise control one or more node C.R.s 1016(1)-1016(N) and/or grouped computing resources 1014. In at least one embodiment, resource orchestrator 1022 may include a software design infrastructure ("SDI") management entity for the data center 1000. The resource orchestrator 1022 may include hardware, software, or some combination thereof.

In at least one embodiment, as shown in FIG. 10, framework layer 1020 may include a job scheduler 1032, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016

(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
    one or more circuits to:
        generate a depth flow image representative of one or more changes in depth values between corresponding pixels of at least two sequential range images;
        pass, using a belief propagation algorithm, data corresponding to one or more adjacent pixels of the depth flow image to update one or more values associated with the one or more adjacent pixels of the depth flow image;
        compute, based at least in part on the one or more updated values, one or more motion vectors in image space corresponding to movement of the one or more adjacent pixels of the depth flow image between the at least two sequential range images; and
        generate a scene flow representation by converting the one or more motion vectors to a corresponding one or more motion vectors in world space.

2. The processor of claim 1, wherein the processor is comprised in at least one of:
    a control system for an autonomous or semi-autonomous machine;
    a perception system for an autonomous or semi-autonomous machine;
    a system for performing simulation operations;
    a system for performing deep learning operations;
    a system implemented using an edge device;
    a system implemented using a robot;
    a system incorporating one or more virtual machines (VMs);
    a system implemented at least partially in a data center; or
    a system implemented at least partially using cloud computing resources.

3. The processor of claim 1, further comprising processing circuitry to:
    determine one or more locations of one or more objects based at least in part on the scene flow representation; and
    perform one or more operations based at least in part on the one or more locations of the one or more objects.

4. The processor of claim 1, further comprising processing circuitry to perform one or more operations based at least in part on the scene flow.

5. The processor of claim 1, wherein the at least two sequential range images are generated using corresponding LiDAR point clouds.

6. The processor of claim 1, wherein, when a pair of another one or more adjacent pixels are determined not to correspond to a same object, data corresponding to the pair of the another one or more adjacent pixels is prevented from being passed.

7. A method comprising:
    generating a depth flow image based at least in part on a first LiDAR range image generated using one or more LiDAR sensors at a first time and a second LiDAR range image generated using the one or more LiDAR sensors at a second time subsequent the first time, the depth flow image including one or more pixels labeled with one or more depth flow values;
    passing data corresponding to at least one pixel of the one or more pixels of the depth flow image to generate an updated depth flow image, the data passed being at least partially indicative of respective depth flow values of the one or more pixels and respective costs of the one or more pixels; and
    calculating, based at least in part on the updated depth flow image, one or more motion vectors representative of relative pixel positions between the first LiDAR range image and the second LiDAR range image.

8. The method of claim 7, wherein the first LiDAR range image and the second LiDAR range image are generated using data representative of one or more LiDAR point clouds.

9. The method of claim 7, wherein the first LiDAR range image is converted to a same coordinate system as the second LiDAR range image based at least in part on calculated ego-motion.

10. The method of claim 7, wherein the first LiDAR range image and the second LiDAR range image each represent at least one of reflectivity information, intensity information, depth information, time of flight (ToF) information, return information, or classification information.

11. The method of claim 7, wherein the one or more motion vectors are calculated in two-dimensional (2D) space, and the method further comprises converting the one or more motion vectors to 3D space to generate one or more 3D motion vectors.

12. The method of claim 11, wherein the one or more 3D motion vectors represent a scene flow representation between the first LiDAR range image and the second LiDAR range image.

13. The method of claim 7, wherein the data corresponding to the at least one pixel of the one or more pixels is passed using a belief propagation algorithm.

14. The method of claim 13, wherein the depth flow image includes a first pixel adjacent a second pixel, and the method further comprises:

determining, based at least in part on depth data from the second LiDAR range image, that the first pixel corresponds to a second object distinct from a first object that corresponds to the second pixel; and preventing the passing of data corresponding to the first pixel based at least in part on the determining.

15. A system comprising:

one or more processing units; and one or more memory units storing instructions that, when executed by the one or more processing units, cause the one or more processing units to execute operations comprising:

generating a depth flow image representative of one or more changes in one or more depth values between corresponding pixels of at least two sequential range images;

passing, using a belief propagation algorithm, data corresponding to one or more adjacent pixels of the depth flow image to update one or more values associated with pixels of the depth flow image;

computing, based at least in part on the one or more updated values, one or more image-space motion vectors corresponding to movement of the one or more adjacent pixels of the depth flow image between the at least two sequential range images; and converting the image-space motion vectors to world-space motion vectors to generate a scene flow representation.

16. The system of claim 15, wherein the system is comprised in at least one of:

a control system for an autonomous or semi-autonomous machine;

a perception system for an autonomous or semi-autonomous machine;

a system for performing simulation operations;

a system for performing deep learning operations;

a system implemented using an edge device;

a system implemented using a robot;

a system incorporating one or more virtual machines (VMs);

a system implemented at least partially in a data center; or a system implemented at least partially using cloud computing resources.

17. The system of claim 15, wherein the operations further comprise:

determining one or more locations of one or more objects based at least in part on the scene flow; and performing one or more operations based at least in part on the one or more locations of the one or more objects.

18. The system of claim 15, wherein the operations further comprise performing one or more operations based at least in part on the scene flow representation.

19. The system of claim 15, wherein the at least two sequential range images are generated using corresponding LiDAR point clouds.

20. The system of claim 15, wherein, when a pair of one or more other adjacent pixels are determined not to correspond to a same object, at least one message is prevented from being passed between the pair of the one or more other adjacent pixels.

\* \* \* \* \*